United States Patent [19]
Mackes

[11] 3,850,115

[45] Nov. 26, 1974

[54] SLIP PALLET OF EXPANDED FOAM MATERIAL

[75] Inventor: Ronald C. Mackes, Northglenn, Colo.

[73] Assignee: BQB Industries, Inc., Denver, Colo.

[22] Filed: Sept. 17, 1973

[21] Appl. No.: 397,666

Related U.S. Application Data

[63] Continuation-in-part of Ser. No. 243,507, March 27, 1972, Pat. No. 3,776,145.

[52] U.S. Cl............................. 108/51, 214/10.5 R
[51] Int. Cl........................................... B65d 19/00
[58] Field of Search ............................. 214/10.5 R; 108/51–58; 206/65 R, 60 A; 220/97 B; 217/43 A

[56] References Cited
UNITED STATES PATENTS

| | | | |
|---|---|---|---|
| 2,328,397 | 8/1943 | Neuman............................ | 108/57 X |
| 3,610,173 | 10/1971 | McIlwraith et al. ................ | 108/57 |
| 3,695,188 | 10/1972 | Granatstein........................... | 108/58 |

FOREIGN PATENTS OR APPLICATIONS

| | | | |
|---|---|---|---|
| 564,184 | 10/1958 | Canada......................... | 214/10.5 R |

*Primary Examiner*—Frank E. Werner
*Attorney, Agent, or Firm*—Van Valkenburgh, Lowe & Law

[57] ABSTRACT

A slip pallet formed as a square or rectangular sheet of a synthetic resin of selected types of polyolefin. The sheet is proportioned to fit upon a platen lift and includes tabs at each edge to be gripped when the platen is thrust underneath the sheet or the sheet is pulled upon or pushed off from the platen. The slip pallet will ordinarily carry loads of boxes formed as interlocking layers and an important feature of the invention resides in providing a sheet having a greater coefficient of friction at the upper surface wherein the boxes are placed, than at the undersurface which is contacted by the platen. The polyolefin material forming the slip pallet is expanded by foaming as a web is formed in an extruding die to reduce the density of the material and to permit a box load upon the pallet to form a secure seat therein.

3 Claims, 12 Drawing Figures

SLIP PALLET OF EXPANDED FOAM MATERIAL

Reference is made to the application filed by myself and Raymond F. Anderson, Ser. No. 243,507, filed Mar. 27, 1972 which is now U.S. Pat. No. 3,776,145 for a plastic Slip Pallet. The present application is a continuation-in-part of that application to disclose and claim improvements in the structures and concepts therein set forth.

This invention relates to pallets and more particularly to improvements in plastic slip pallets for handling loads of boxes and the like.

The background for improvements in slip pallets, and particularly in plastic slip pallets, is set forth in the above noted application, Ser. No. 243,507, wherein it is pointed out that the prior art concerning slip pallets involved the use of chipboard pallets. Such a pallet is carried by a truck having a flat platen lift which slides underneath the pallet to pick up it and its box load. The problems involved in using chipboard pallets centered about the fact that they would tear apart if used more than once or twice.

As a result, there existed a need for an improved slip pallet, and the application, Ser. No. 243,507, discloses a slip pallet formed as a sheet of a selected type of thermoplastic polyolefin resin. The outstanding feature of this improved slip pallet is that its upper and lower surfaces have different frictional resistance, and the frictional resistance between the undersurface of the pallet and the surface of a platen is less than the functional resistance between the upper surface of the pallet and the surfaces of the boxes loaded upon the pallet.

The present invention comprises, further, a plastic slip pallet having the basic characteristics hereinbefore disclosed, using selected types of thermoplastic polyolefin resins but with the use of foaming agents applied to the resin as it is being extruded to enhance the desired physical characteristics of the materials and to gain other advantages as hereinafter set forth.

An object of the present invention is to provide a novel and improved slip pallet formed by foaming a selected resin material to a specified density to attain a desired balance of the thickness and weight of the pallet, to the strength of the resin, especially in uses where the strength of the resin in a solid pallet of suitable thickness is far in excess of that which is needed.

Another object of the invention is to provide a novel and improved slip pallet formed by foaming a selected resin material to a specified density which, when loaded with boxes, will yield slightly to more effectively grip and hold the boxes in position.

Another object of the invention is to provide a novel and improved slip pallet of a foamed plastic resin material having a comparatively slippery undersurface and a comparatively rough, top surface which will yield to better grip box loads thereon and stay in position whenever a platen is being thrust underneath or pulled from the box load.

Other objects of the invention are to provide a novel and improved foamed plastic slip pallet which is a simple, versatile, rugged and tough item, and which may be manufactured at a minimum cost with conventional extrusion and forming machinery.

With the foregoing and other objects in view, my present invention comprises certain constructions, combinations and arrangements of parts and elements as hereinafter described, defined in the appended claims and illustrated in preferred embodiment by the accompanying drawings in which:

Figure 10:
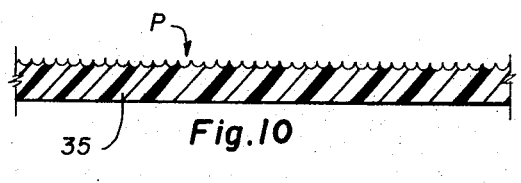
FIG. 10 is a fragmentary sectional view of the pallet as taken from the indicated line 10—10 at FIG. 9 but on a greatly enlarged and exaggerated scale to indicate in a diagrammatic manner differences in the texture between the upper and lower surfaces of the sheet.
Figure 11:
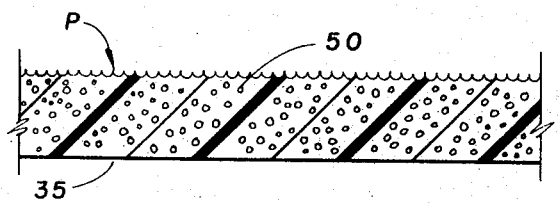
Figure 12:
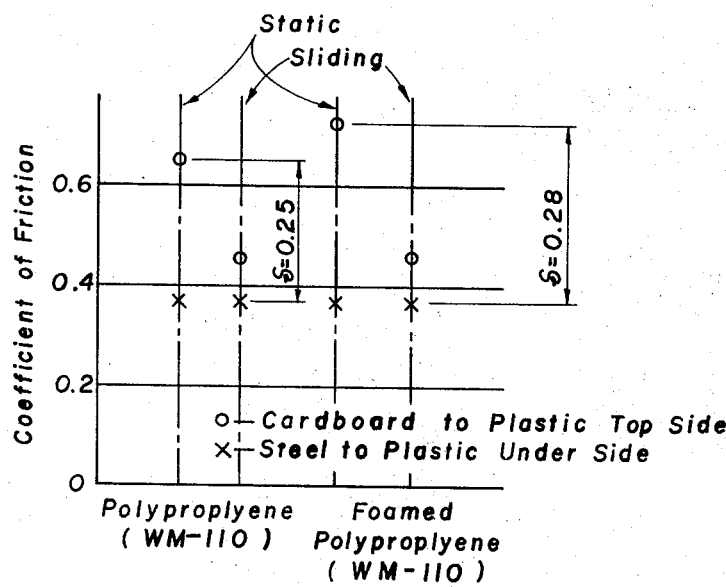

FIG. 11 is a diagrammatic, fragmentary sectional view similar to FIG. 10, but showing an embodiment of the pallet which is formed with a foamed plastic resin; and FIG. 12 is a diagram indicating various frictional coefficients which are significant in considering the behavior of a loaded pallet when the platen is being thrust underneath it, including properties obtained with a foamed plastic material.

Figure 1:
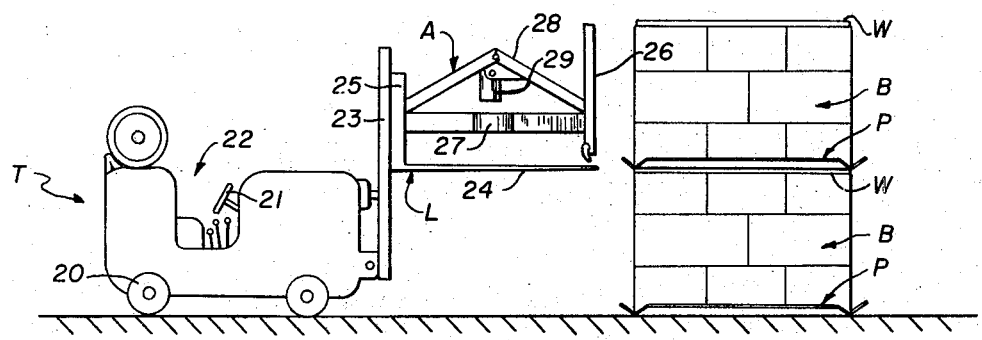
FIG. 1 is a small scale sketch showing a side elevational view of a lift truck carrying a platen and a push-pull attachment above it, and showing further, two loads of boxes stacked, one upon the other and separated by a slip pallet, the figure being exemplary of the manner in which the slip pallets are used and the type of apparatus used to handle them.
Figure 2:
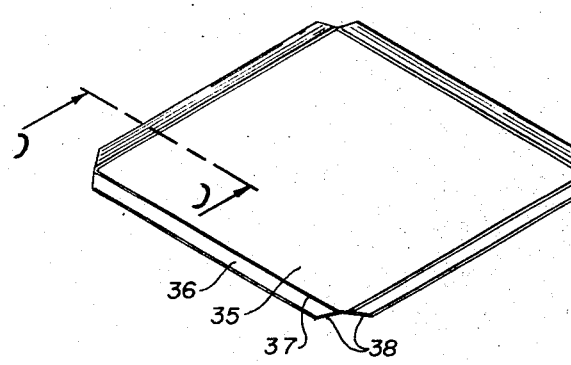
FIG. 2 is a perspective view of a slip pallet per se, constructed according to the present invention.
Figure 3:
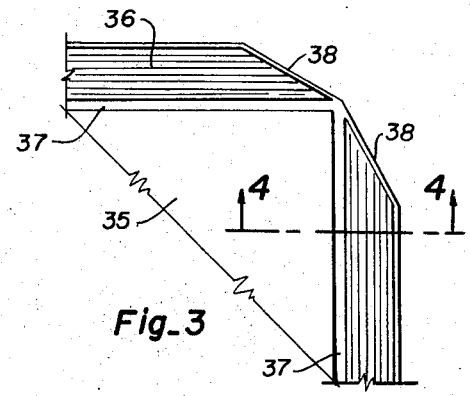
FIG. 3 is a plan view of a corner portion of the pallet shown at FIG. 2, but on an enlarged scale.

Referring more particularly to the drawing, a typical use of a slip pallet is illustrated at FIG. 1, which is exemplary of the manner in which box loads B are stacked in a warehouse upon slip pallets P. A slip pallet per se is illustrated at FIG. 2 as described in detail. First, however, the manner in which slip pallets are used and the apparatus for using them will be described to provide a better understanding of the operative problems encountered in the use of slip pallets and the need for the improvements disclosed in the present invention.

In the usual storage operation, the length and width of boxes are proportioned in such a manner as to permit a box load B which is carried upon a slip pallet P to be made up of a selected number of layers of boxes with each layer of boxes forming a rectangle or square of selected proportions which is the same size as the slip pallet P. The boxes of each layer in the load are preferably arranged in an interlocking pattern with respect to the boxes of adjacent layers to maintain the integrity of the load. In the drawing, each load of boxes B is depicted as having a square base with six boxes in each layer and being three layers high and with the boxes in the layers arranged in an interlocking pattern. To complete each box load, a plywood sheet W is placed upon the top of each box load to form a protective surface whereon a slip pallet P of the upper load will rest. Two such box loads are illustrated, with one being stacked upon the other and with each box load being carried upon a slip pallet P. Such is illustrative only and the number of layers in a box load may be considerably more than the three illustrated. Also, the number of loads forming a stack can vary and such will depend entirely upon the size and weight of the boxes, and the capacity and reach of the platen lift L.

The platen lift L, which will pick up a box load upon a slip pallet, will be carried upon a truck T of a type ordinarily referred to as a fork lift truck and indicated in a somewhat diagrammatic manner at FIG. 1. This truck T is provided with driving wheels 20, a steering wheel 21, a suitable power plant, not shown, and an operator's section 22 where controls for driving the truck and for raising and lowering and otherwise operating the platen lift L are located. The platen lift is carried upon a normally vertical guide 23 at the front of the truck. Suitable controls and mechanisms will tip this guide 23 forwardly or rearwardly from its vertical position and raise and lower the platen lift along the guide, all in a conventional, well-known manner. The platen 24 of the lift is a comparatively thin, spatula-like sheet affixed to an upright backstop 25 which, in turn, is mounted on the vertical guide 23. The width and depth of this platen 24 is selected to hold a pallet P and to accommodate a box load B such as in the stack illustrated at FIG. 1. It is contemplated that even though several types of boxes are used in a given warehouse operation, they will all be proportioned in such a manner as to form box loads which fit upon the pallets P and upon the platen lift L, all in the interest of economy of handling operations.

Figure 6:
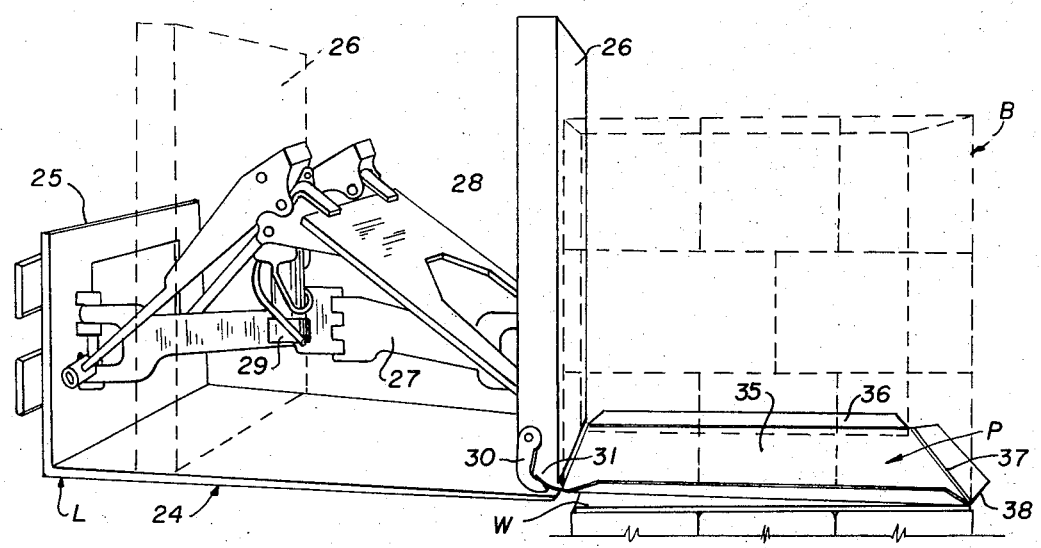
FIG. 6 is a perspective view of the platen of the lift truck with its push-pull attachment being extended to the end of the platen and gripping the tab of a slip pallet, the view depicting further, in dotted lines, the outline of a box load upon the slip pallet and, also, the retracted position of its push-pull attachment.

As illustrated at FIGS. 1 and 6, the platen lift L will include a push-pull attachment A, which is mounted upon the backstop 25 of the platen. This push-pull attachment includes a shiftable abutment 26 held in a vertical transverse position above the platen by a horizontal swing arm 27 and secured in a transverse relationship with respect to the edges of the platen by a comparatively wide upward fold arm 28 attached to the backstop 25 and to the back face of the abutment 26. Suitable hydraulic rams 29 coact with this arm to push the abutment wall 26 forwardly and to the forward leading edge 24a of the platen, as illustrated, and to pull the abutment 26 rearwardly toward the backstop 25 as indicated in broken lines at FIG. 6. Suitable controls at the operator's section 22 regulate this push-pull movement of the abutment 26 as well as the raising and lowering and tipping of the platen 25. It is thus a simple matter for the truck operator to position the leading edge 24a of the platen 24 against the under edge of a pallet P when the truck is moved against a stack of box loads B.

An elongated gripper 30 is pivotally mounted at the back side of the abutment 26 and it is adapted to swing against the undersurface 31 of the abutment 26 to grip and hold a pallet tab as will be described. The gripper is operated by conventional hydraulic pressure members within the framework of the abutment 26 which are not shown. The undersurface 31 slopes upwardly and rearwardly from the bottom edge of the front of the abutment and the gripper 30 is formed as a hook-like member having a projecting, finger-like edge which swings into and against this surface 31 without projecting below the front bottom edge of the abutment. Thus, an upturned pallet tab can be gripped and held at the bottom of the abutment, with the bottom of the abutment being closely adjacent to the top surface of the platen 24, and with the platen thus being positioned to move underneath the slip pallet P.

The improved slip pallet P is a sheet of a selected blend of polyolefin resin as hereinafter described. This sheet is comparatively thin for its size and a practical range of thickness is from approximately 20-mils to 125-mils, and preferably, in the range of one-sixteenth inch. This sheet is rectangular or square and is proportioned to hold a selected box load B and to set upon the platen 24.

The sheet forming the slip pallet P will include the rectangular or square central area 35 for the box load and one or more marginal pull tabs 36 at the edges of this central area. Pull tabs may extend from each of the four edges of the central area as illustrated, or it may extend from one, two or three of the edges. While only one pull tab 36 will be used at a time, several advantages are to be gained with a pull tab projecting from several sides of the pallet. In the first place, if one tab is accidentally torn away, the pallet is still usable. Also, with several tabs available, for example with four tabs, the pallet may be gripped and loaded onto the platen from any direction.

Figure 4:
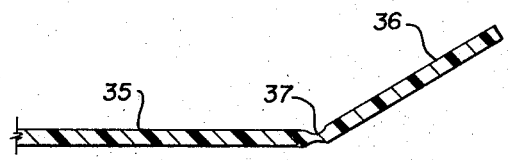
FIG. 4 is a fragmentary sectional portion as taken from the indicated line 4—4 at FIG. 3, but being exaggerated in thickness to better illustrate the construction thereof.
Figure 5:
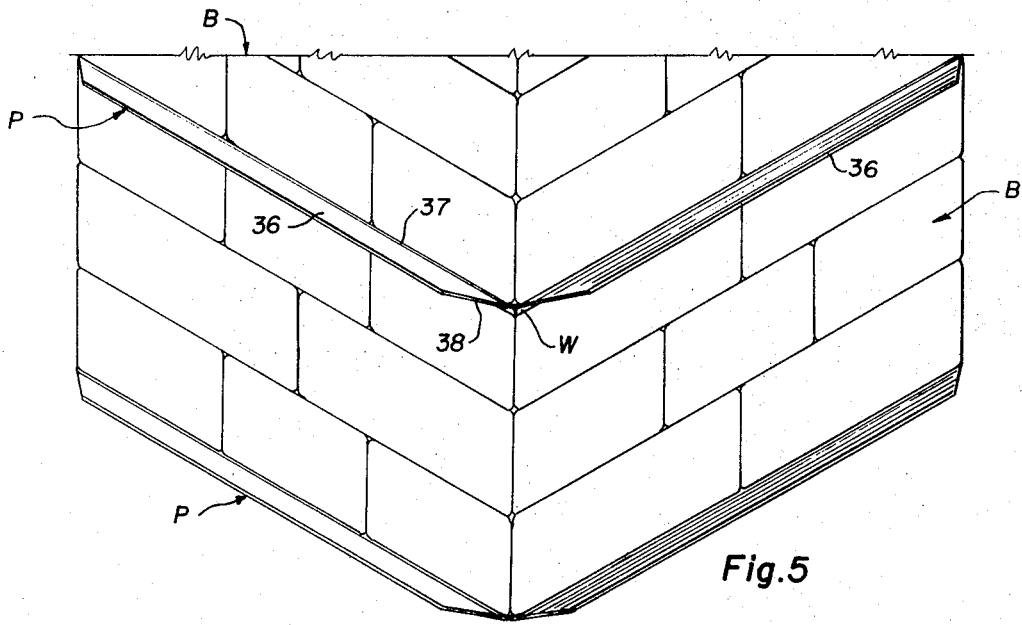
FIG. 5 is an isometric view of a portion of the stacked box loads shown at FIG. 1, showing pull tabs of the slip pallets protruding from the sides of the stack.

To facilitate the gripping of a tab 36 at the undersurface of the abutment, each pull tab is folded upwardly at an angle of about thirty degrees from the plane of the central area 35 by creases 37. Such creases may be pressure and/or heat formed in the surface of the pallet and may be formed at one, or at both sides of the pallet as illustrated at FIG. 4. To complete the pallet, each corner 38 of each tab is cut at an angle of approximately 45° with respect to the tab edge, so a tab corner will not interfere with an adjacent corner as when the tabs are folded upwardly.

Figure 7:
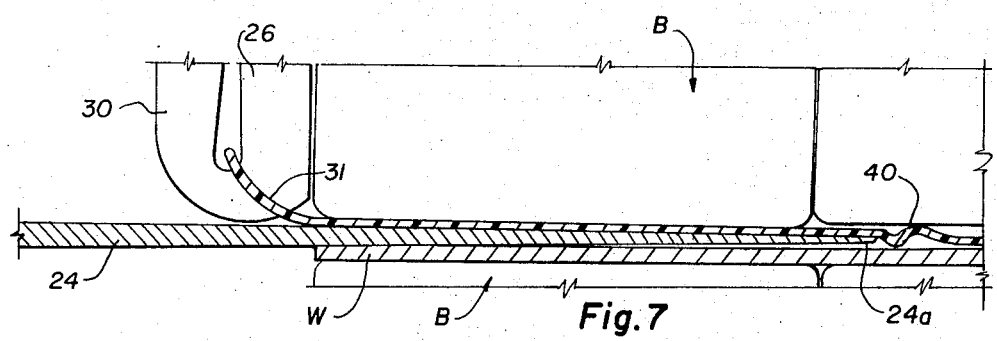
FIG. 7 is a fragmentary sectional view showing a portion of the stacked box loads with the box loads being separated by a slip pallet, with the pallet being gripped by the push-pull attachment of a platen lift, and with the lift being thrust partway underneath the slip pallet preliminary to completing the thrust and picking up the pallet and the box load upon it.
Figure 8:
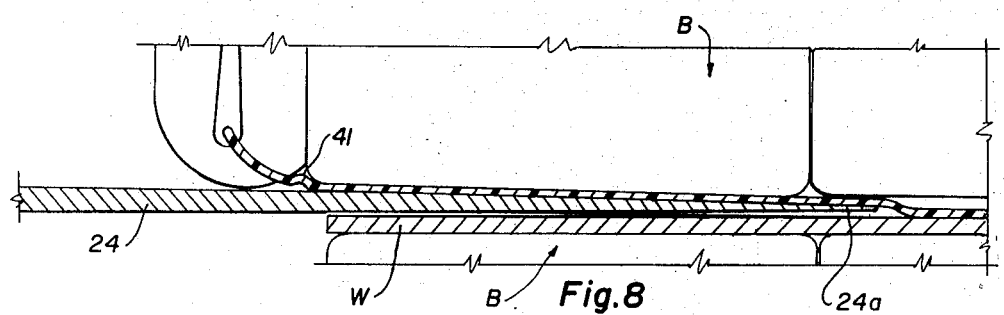
FIG. 8 is a diagrammatic view similar to FIG. 7 but illustrating the behavior of a loaded slip pallet whenever the platen is being pulled out from underneath it preliminary to removing the platen from the box load.
Figure 9:
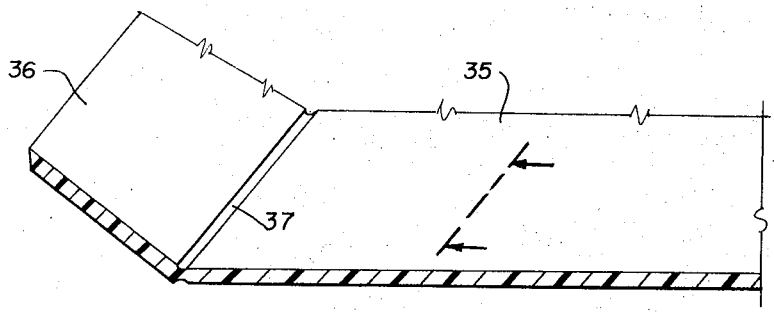
FIG. 9 is a fragmentary sectional perspective detail as taken substantially from the indicated line 9—9 at FIG. 2 but on an enlarged scale.

A better understanding of the problems arising in the use of a slip pallet, when the platen is moved underneath it, is possible by referring to FIGS. 7 and 8. In moving the platen 24 underneath a slip pallet supporting a box load, the first steps are: to adjust the elevation of the platen to the elevation of the pallet; extend the abutment 26; move the leading edge 24a of the platen and abutment against the box load; and grip and hold the projecting pallet tab 36 at the underside of the abutment. The platen 24 then commences its extension movement underneath the pallet and this thin, spatula-like platen 24 lifts the slip pallet and its load of boxes a small vertical distance, the thickness of the platen, as illustrated at FIG. 7. When the platen is completely underneath the slip pallet, the box load B may then be lifted and transported by the truck T. It is to be noted that the preferred mode of loading a slip pallet upon the platen is to move the platen itself under the box load by movement of the truck carrying the platen. At the same time, the abutment 26 moves to its retracted position with respect to the platen, but remains stationary with respect to the box load. It is also possible to pull the box load onto the platen by moving the abutment 26 to its retracted position without moving the truck. However, this latter mode of loading the platen is not recommended because a much larger pulling force is required on the tab 36 being gripped by the abutment and this force could tear the tab from the central area 35, especially if the material forming the slip pallet does not have a high tensile strength.

Regardless of whether the platen 24 is thrust underneath the slip pallet P or the slip pallet is pulled onto the platen, the force pulling the tab 36 will be substantial. This will be caused by the friction between the undersurface of the pallet and the platen when the platen moves under the pallet. A ripple 40 will form in the pallet ahead of the leading edge 24a of the moving platen. This ripple 40 will assume various forms such as that illustrated at FIG. 7 and can become quite serious if the pallet is not effectively restrained. This ripple also requires that the material forming the pallet be tough and flexible, for otherwise, the leading edge 24a of the platen would move into this ripple to tear the pallet material. The pallet material cannot be brittle; otherwise, the bending action of the ripple would cause it to crack.

When the box load B and its pallet P are to be discharged from the platen, the frictional drag between the pallet and the platen is in the opposite direction to the pull hereinabove described. In discharging the box load, the abutment 26 holds the box load while the platen is retracted from underneath it. To accomplish this, the truck T carrying the platen moves away from the box load while the abutment 26 is extended over the platen to push off the box load. This creates a substantial frictional force tending to pull the pallet from underneath the box load or buckle the pallet. A buckling action 41 will occur at the edge of the tab gripped by the abutment, as shown at FIG. 8. If the buckling 41 at this edge is severe, it can damage the hinge crease 37 to cause the tab to be torn away from the pallet during a subsequent use. This buckling 41 is especially serious when using chipboard pallets.

Slip pallets manufactured from synthetic resin plastics are disclosed in the previously mentioned application, Ser. No. 243,507, now U.S. Pat. No. 3,776,145. As set forth therein, a satisfactory plastic slip pallet must have sufficient strength to withstand a pull against a tab 36 when the platen moves underneath a loaded pallet. Also, the frictional resistance between the undersurface of the pallet and the platen must be less than the frictional resistance between the upper surface of the pallet and the box load upon the pallet. With such a pallet, the platen will slide freely when it is being pushed underneath the pallet, or pulled therefrom. At the same time, a box load upon the pallet will remain essentially stationary and minimize the rippling and buckling actions, such as ripple 40 and buckling 41 heretofore described.

The prior application, Ser. No. 243,507 further discloses that the difference in frictional resistance of the upper and lower surfaces of a pallet can be effected by texturing the upper and undersurface of the pallet or by using different materials, as in a laminate. The texturing of the upper surface to create increased frictional resistance between that surface and a box load upon it can be easily obtained by using a textured sizing and cooling roll in the machinery extruding hot thermoplastic material into a web to form the pallet. In accordance with standard procedure, the texture of such roughness can be measured comparatively with mold surface standards defined in micro-inches of depth. A depth of 60 micro-inches, or more, of surface roughness has been found to be satisfactory. A slight and substantially smaller surface roughness may be provided at the undersurface and this roughness is merely sufficient to permit air to be present between the plastic and steel surfaces of the pallet and platen to prevent suction effects between these surfaces. It was found that whenever the coefficient of friction between the upper surface and a box load was at least approximately 0.15 greater than the coefficient of friction between the platen and the undersurface of the pallet, the pallets and their loads could be lifted onto a platen without trouble. Preferably, however, this difference in the coefficient of friction should be as much as 0.25 or 0.30, or even more.

Suitable materials for the improved slip pallet were found to include:

1. Polypropylene WM-110, furnished by the Shell Chemical Company of Houston, Tex.

This is a rubber-modified polypropylene, the exact components of which are proprietory information of the Shell Oil Company.

2. Profax 7823, furnished by the Hercules Powder Company of Wilmington, Del.

This is a copolymer of polypropylene and one or more other monomers, the exact components of which are proprietory information of the Hercules Powder Company.

3. Bestflex 401, furnished by Best Quality Plastics, Inc. of Denver, Colo.

This is a blend of high impact polypropylene and ethylene hexene copolymer, the exact components of which are proprietory information of Best Quality Plastics, Inc.

4. PlasKon PP 60-002, furnished by the Allied Chemical Company of Morristown, N.J.

This is a linear polyethylene.

5. PlasKon AB 50-003, furnished by the Allied Chemical Company of Morristown, N.J.

This is a copolymer of ethylene and one or more monomers, the exact components of which are proprietory information of Allied Chemical Company.

The preferred thickness of a slip pallet was approximately one-sixteenth inch and the preferred tensile strength of the materials was in the range of 2,500–4,500 psi, as determined by ASTM specification D638–67T. Other desirable physical properties of the material include: A vicat softening point temperature in excess of 250° F. as determined by ASTM designation D1525–65T; a brittle point temperature of at least below −20° F. as determined by ASTM specification D746–64T; and a stiffness measurement in the range of 100,000 to 150,000 psi as determined by ASTM specification D747–63. Where the pallets are to be used in low temperature environments, as in refrigerated warehouses, the selected material should have a lower brittle point temperature, such as in the range of −40° F.

The thickness of the pallet, which can vary from 20 mils to 125 mils as practical limitations must be sufficient to minimize the rippling and buckling actions 40 and 41 as the platen moves underneath and from the pallet, as hereinbefore described. It is immediately manifest that such thickness necessary to impart a degree of rigidity to the pallet will be related to the flexibility of the material forming the pallet and not necessarily to its tensile strength. The tensile strength of the material is more important in relation to pull on the tab 36 when the platen is being pushed under the pallet. Accordingly, some synthetic resin materials from which pallets may be manufactured may have a tensile strength in excess of that which is needed for most applications while others, otherwise suitable, may be deficient in tensile strength. For example, some selected types of high impact polypropylene have a greater tensile strength than that needed for pallets, while some types of low density polyethylene may not have sufficient tensile strength for pallets handling normal loads.

The present invention contemplates the use of resins having an excess of tensile strength and it is immediately emphasized that with the thicknesses needed for stability against rippling or buckling, as heretofore described, more resin may be needed for the manufacture of a platen than absolutely necessary. Accordingly, to save on material, the present invention contemplates the use of a foaming agent to produce foam 50 in the pallet as diagrammatically indicated at FIG. 11. The foaming may be accomplished when the resin material is being blended as in the blending action of an extruding die. Such foaming agents, which include carbon dioxide gas, and the manner in which these foaming agents are applied to resins is well known in the art and need not be described beyond mentioning that the foaming action will occur in the blending section of the extruding apparatus and the web extruded from the extruding dies will be foamed in a uniform manner, ordinarily with slick surfaces when the material is sized in rolls.

The foaming will decrease the density of the resin and, accordingly, industrial standards specify various degrees of foaming as by the density of the final product. Such foaming may vary from a light degree where the density is practically the same as that of the unfoamed material to lightweight materials which may be as light as only 3 or 4 pounds per cubic foot.

In the present invention, the foaming will usually be sufficient to reduce the weight of the resin to not more than approximately 65 percent of its own unfoamed weight and tests can be performed to determine a suitable balance between the tensile strength of the foamed material and that needed when the pallet is being used.

It was noted that when a pallet is manufactured by providing a roughened upper surface and a smooth undersurface, according to the teaching of the aforementioned U.S. Pat. No. 3,776,145, that the foamed plastic appeared to have an exceptionally rough upper surface but a remarkably smooth undersurface. The upper surface was not only roughened by a textured roll, as heretofore described, but some roughness appeared as pocks, resulting from the effect of the foam. Also, whenever a box load is placed upon a foamed pallet, the pallet will yield slightly responsive to the weight of the boxes and especially at irregularities in the box surfaces, as might be caused by staples. The result is that the pallet will be more effective in holding the boxes against slipping. This is indicated at FIG. 12 which compares the fricitional resistances between the upper surface of a pallet and a box load with the undersurface of the pallet and a platen, as described in the aforementioned U.S. Pat. No. 3,776,145.

As an example of the present invention, a sheet of WM high impact polypropylene was foamed to reduce the density of the material from 55 pounds per cubic foot to approximately 35 pounds per cubic foot. The completed pallet was slightly greater than one-sixteenth inch thick. The resulting pallet, although significantly lighter in weight, had adequate stiffness to minimize the rippling 40 and buckling 41 heretofore alluded to. Also, at the same time, sufficient strength to prevent tabs from tearing when the pallet was being pulled onto a platen.

The degree of foaming to reduce the weight of the pallet depends upon the weight of the box load carried upon the pallet, and the foamed product could be as light as 10 pounds per cubic foot as a reasonable limitation.

It is apparent from the foregoing that yet other combinations, arrangements and equivalent materials can be efficiently used in the manner herein disclosed and that others skilled in the art can build alternate and equivalent constructions of such slip pallets. Hence, I desire that my protection be limited not by the constructions illustrated and described, but only by the proper scope of the appended claims.

I claim:

1. A slip pallet for holding a load of cardboard boxes, or the like, and carried by a platen which slides underneath the slip pallet and its box load for loading and unloading the same onto and off from the platen, said pallet comprising:

a tough, pliable sheet of single thickness of synthetic thermoplastic resin having a thickness in the range of approximately 20 to 125 mils;

a central area whereon the box load is placed;

a tab means alongside at least one edge of this central area folded upwardly along the edge of the central area to be gripped and held whenever the platen is moving underneath the pallet from the tab side;

a modified upper surface at the central area adapted to enhance the contact thereof with the cardboard surfaces of the box load upon the pallet sufficient to increase the static frictional resistance between the box load and the pallet to a degree which exceeds the sliding frictional resistance between the pallet and the platen, and wherein said synthetic thermoplastic resin is reduced in density by foaming the same.

2. The slip pallet defined in claim 1, wherein:

the density of the foamed thermoplastic resin is not more than 65 percent of the density of the unfoamed resin.

3. The slip pallet defined in claim 1, wherein:

the undersurface of the pallet is smooth and the upper surface of the pallet is modified by roughnesses which include foam pocks.

* * * * *

UNITED STATES PATENT OFFICE
CERTIFICATE OF CORRECTION

Patent No. 3,850,115　　　　　Dated November 26, 1974

Inventor(s)　　　　Ronald C. Mackes

It is certified that error appears in the above-identified patent and that said Letters Patent are hereby corrected as shown below:

On the cover page of the patent, after "[73] Assignee:" delete "BQB Industries, Inc." and insert -- BQP Industries, Inc. --.  Column 7, line 47, "light" should read -- slight --.

Signed and sealed this 18th day of February 1975.

(SEAL)
Attest:

RUTH C. MASON
Attesting Officer

C. MARSHALL DANN
Commissioner of Patents
and Trademarks